US010594245B2

(12) United States Patent
Plainer et al.

(10) Patent No.: US 10,594,245 B2
(45) Date of Patent: Mar. 17, 2020

(54) CONTROLLING LONG-STATOR LINEAR MOTOR COILS OF A LONG-STATOR LINEAR MOTOR STATOR

(71) Applicant: B & R INDUSTRIAL AUTOMATION GMBH, Eggelsberg (AT)

(72) Inventors: Manuel Plainer, Weissenkirchen i.A. (AT); Stefan Brucker, Salzburg (AT); Andreas Weber, Salzburg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/105,366

(22) Filed: Aug. 20, 2018

(65) Prior Publication Data
US 2019/0058432 A1   Feb. 21, 2019

(30) Foreign Application Priority Data

Aug. 21, 2017   (EP) ..................................... 17187110

(51) Int. Cl.
*H02P 25/062*   (2016.01)
*H02P 25/064*   (2016.01)
(Continued)

(52) U.S. Cl.
CPC ............ *H02P 25/064* (2016.02); *B60L 13/03* (2013.01); *B65G 54/02* (2013.01); *H02K 41/03* (2013.01);
(Continued)

(58) Field of Classification Search
CPC ............ B65G 47/082; B65G 47/5113; B65G 47/842; B65G 47/841; B65G 47/5104; B65G 47/847; H02P 6/10; H02P 3/24
See application file for complete search history.

(56) References Cited

U.S. PATENT DOCUMENTS 5,587,852 A * 12/1996 Yoshiura ................ G11B 5/553
310/12.08
5,607,045 A *  3/1997 Hermann Kronseder ....................
B08B 9/42
198/476.1
(Continued)

FOREIGN PATENT DOCUMENTS

WO    2004/103792    12/2004
WO    2005/110898    11/2005
(Continued)

OTHER PUBLICATIONS

Europe Search Report/Office Action conducted in counterpart Europe Appln. No. 17187110.6-1202 (dated Jan. 30, 2018).

*Primary Examiner* — Rina I Duda
(74) *Attorney, Agent, or Firm* — Greenblum & Bernstein, P.L.C.

(57) ABSTRACT

Method and device for controlling the electrical variables and/or LLM currents of LLM coils of an LLM stator, the movement of a first transport unit is controlled by an associated first transport controller, the movement of a second transport unit is controlled by an associated second transport controller, and a control unit checks whether the first transport controller intends to specify a first controlled variable for an LLM coil and whether the second transport controller simultaneously intends to specify a second controlled variable to the same LLM coil. In this case, either an additional controlled variable, which is derived from the first controlled variable and/or the second controlled variable using a predetermined function f (Ux=f(Ux', Ux"), or Ux=f (Ux') or Ux=f(Ux")), is specified for the LLM coil, or the coil terminals of the LLM coil (Lx) are short-circuited.

8 Claims, 4 Drawing Sheets

(51) Int. Cl.
*B65G 54/02* (2006.01)
*H02K 41/03* (2006.01)
*H02P 6/00* (2016.01)
*B60L 13/03* (2006.01)

(52) U.S. Cl.
CPC ............ *H02P 6/006* (2013.01); *H02P 25/062* (2016.02); *H02K 41/031* (2013.01)

(56) References Cited

U.S. PATENT DOCUMENTS

| | | | |
|---|---|---|---|
| 6,209,710 B1 * | 4/2001 | Mueller | ............... B65G 17/323 |
| | | | 198/470.1 |
| 6,876,107 B2 | 4/2005 | Jacobs | |
| 7,746,023 B2 * | 6/2010 | Ajima | ........................ H02P 6/10 |
| | | | 318/700 |
| 8,294,391 B2 * | 10/2012 | Kubo | ........................ H02P 3/24 |
| | | | 310/12.19 |
| 9,233,800 B2 * | 1/2016 | Senn | ..................... B65G 47/082 |
| 2008/0006172 A1 | 1/2008 | Thornton | |
| 2008/0115372 A1 | 5/2008 | Vogel et al. | |
| 2009/0107806 A1 | 4/2009 | Mendenhall | |
| 2013/0074724 A1 | 3/2013 | King et al. | |
| 2015/0008768 A1 | 1/2015 | Achterberg et al. | |
| 2017/0117829 A1 | 4/2017 | Yamamoto | |

FOREIGN PATENT DOCUMENTS

| | | |
|---|---|---|
| WO | 2008/005428 | 1/2008 |
| WO | 2013/143783 | 10/2013 |

\* cited by examiner

CONTROLLING LONG-STATOR LINEAR MOTOR COILS OF A LONG-STATOR LINEAR MOTOR STATOR

CROSS-REFERENCE TO RELATED APPLICATIONS

The present application claims priority under 35 U.S.C. § 119(a) of Europe Patent Application No. 17187110.6 filed Aug. 21, 2017, the disclosure of which is expressly incorporated by reference herein in its entirety.

BACKGROUND OF THE INVENTION

1. Field of the Invention

Embodiments relate to a method and a device for controlling the movement of two transport units of a long-stator linear motor comprising a plurality n of long-stator linear motor (LLM) coils arranged adjacently in the direction of movement, the first transport unit comprising a first plurality of first drive magnets arranged adjacently in the direction of movement, and the second transport unit comprising a second plurality of second drive magnets arranged adjacently in the direction of movement, the movement of the first transport unit being controlled by an associated first transport controller in that the first transport controller calculates the electrical variables to be specified for a first portion of the plurality n of LLM coils, the movement of the second transport unit being controlled by an associated second transport controller in that the second transport controller calculates the electrical variables to be specified for a second portion of the plurality n of LLM coils, and it being checked whether a first controlled variable is specified by the first transport controller for an LLM coil as an electrical variable and whether a second controlled variable is specified by the second transport controller for said LLM coil as an electrical variable, and a long-stator linear motor comprising a device of this kind.

2. Discussion of Background Information

In a long-stator linear motor (LLM), a plurality of adjacent electrical LLM coils, which form the stator, are arranged adjacently so as to be fixed along a transport route. A number of drive magnets, either as permanent magnets or as an electrical coil or a short-circuit winding, is arranged on a transport unit, which magnets interact with the LLM coils. The long-stator linear motor may be designed as a synchronous machine, either self-excited or separately excited, or as an asynchronous machine. Due to the interaction of the (electro)magnetic fields of the drive magnets and the LLM coils, a propelling force acts on the transport unit and moves the transport unit forwards in the direction of movement. This occurs by actuating the individual LLM coils in order to control the magnetic flow. The magnitude of the propelling force is therefore influenced and the transport unit can be moved along the transport route in any desired manner. In this case, it is also possible to arrange a plurality of transport units along the transport route, the movements of which transport units can be controlled individually and independently of one another, in that the drive coils interacting with a transport unit can be energized respectively. Usually, an electrical variable is specified by a transport controller, which variable applies a terminal voltage to the coil terminals either directly or via a coil controller connected downstream or impresses a coil current into the LLM coil. Long-stator linear motors are characterized in particular by better and more flexible use over the entire operating range (rotational frequency, position, speed, acceleration), individual regulation/control of the movable transport units (shuttles), improved use of energy, a reduction of the maintenance costs due to the lower number of parts subject to wear, simple replacement of the transport means, efficient monitoring and error detection and optimization of the product flow. Long-stator linear motors are increasingly used as an alternative to conventional continuous conveyors or rotary-to-linear translation units (e.g. rotary motors on conveyor belt, drive belts, chains etc.) in order to satisfy the requirements of modern, flexible logistics units. Examples of long-stator linear motors of this kind can be found in WO 2013/143783 A1, U.S. Pat. No. 6,876,107 B2, US 2013/0074724 A1 or WO 2004/103792 A1.

In order to move a transport unit along the stator, a moved magnet field is generated along the stator by the LLM coils, as mentioned, which magnet field interacts with the drive magnets of the transport units. For this purpose, terminal voltages or coil currents of the LLM coils are controlled by a transport controller or a coil controller arranged downstream. In order to actuate the LLM coils or the coil controllers of the LLM coils, a transport controller for each transport unit is usually used, which transport controller, analogously to the rotary case, controls the currents and voltages to be applied to the individual LLM coils, proceeding from a d/q coordinate system. A transport unit therefore moves along the LLM coils of a stator, a transport controller actuating the adjacent LLM coils of the stator to a certain extent by means of an electromagnetic field.

However, if two transport units moved along the stator have different speeds, said units may approach one another. For example, a first transport unit may be stationary and another transport unit may move towards the first transport unit, or two transport units have opposite directions. In order to avoid a collision of the transport units, a safety measure is usually provided for preventing this.

US 2017/0117829 A1 concerns actuating the coil currents of LLM coils, copper losses being minimized. This takes into consideration that the LLM coils of a long-stator linear motor are influenced by the drive magnets of the transport units, too. Coil units consist of a group of coils. As is known, the total amount of the drive magnets of a transport unit must be greater than the individual actuable LLM coils of the stator, as the transport unit could not be moved otherwise. The second embodiment also concerns a case in which two transport units overlap a coil unit. The coil current of the central LLM coil of this coil unit is set to zero. However, this "absent" current is compensated by the additional LLM coils of the coil unit. In the third embodiment, a coil current applied to the coil unit is calculated if a transport unit is controlled only by one coil unit, i.e. overlaps the coils of the relevant coil unit.

SUMMARY OF THE EMBODIMENTS

Embodiments are directed to a method and a device for controlling voltages or currents of LLM coils of an LLM stator, which device makes it possible to conceive more compact transport units and reduces mutual influence of the two transport units.

According to embodiments, method includes an additional controlled variable that is derived from the first controlled variable and/or the second controlled variable using a predetermined function f is specified for the LLM coil or the coil terminals of the LLM coil are short-circuited.

Furthermore, embodiments provide a control unit that is connected to the first and second transport controllers and to an LLM coil, and is designed to check whether a first controlled variable is specified by the first transport controller for the LLM coil as an electrical variable and whether a second controlled variable is simultaneously specified by the second transport controller for the same LLM coil as an electrical variable and, in this case, either to specify an additional controlled variable, which is derived from the first controlled variable and/or the second controlled variable using a predetermined function f, for the LLM coil as an electrical variable or to short-circuit the coil terminals of the LLM coil.

The electrical variable or the controlled variable may directly represent a terminal voltage or a coil current of the LLM coils and may be supplied directly to the LLM coils or to an amplifying circuit. The amplifying circuit may, depending on whether the electrical variable, or controlled variable, is a voltage or a current, contain a coil controller, i.e. a voltage controller or current controller, and further apply a terminal voltage (e.g. a PWM signal) to the coil terminals of the LLM coil, for example. The amplifying circuit for providing the necessary power may therefore be directly provided on the transport controller, on a coil controller or on the coil. In particular, if the controlled variable is a terminal voltage, the controlled variable may also be implemented as a pure controlled variable that is merely amplified. In the case of transport units according to the prior all, it may be the case that two transport units approach one another to the point of physical contact, whereby an LLM coil would be overlapped by both transport units. To date, however, the transport units have been designed such that the drive magnets are placed in the center respectively and do not extend as far as the edge of the transport unit. The LLM coil therefore cannot be overlapped by both transport units at the same time, despite overlapping the transport units. According to the invention, the transport units can now be designed more compactly, or the drive magnets can occupy a greater region of the transport units, because possible conflict when an LLM coil is controlled is recognized and resolved. It could be the case that two transport units are so close to one another before a possible collision, and therefore before any safety measures are taken, that at least part of the first and second drive magnets of the first and second transport units overlap an LLM coil. This would mean that the transport controller associated with the first transport unit intends to specify the electrical variable for this LLM coil in the form of the first controlled variable and the transport controller associated with the second transport unit also intends to specify the electrical variable for the same LLM coil in the form of the second controlled variable, as the drive magnets of the two transport units are in the region of influence of this LLM coil. It would therefore no longer be possible to uniquely control the electrical variable of this LLM coil and there would be conflict between the two transport controllers. A first controlled variable would be specified by the first transport controller for the relevant LLM coil as a target value for the electrical variable and a second controlled variable would be specified by the second transport controller for said coil as (another) target value. According to the invention, there is, however, a unique specification for each LLM coil in order to control the electrical variable and there is no conflict between the first transport controller and the second transport controller, which controllers originally intended to specify a first controlled variable and a second controlled variable, respectively, for the same LLM coil. I.e. even when the first portion of LLM coils (i.e. the LLM coils that are to be controlled by the first transport controller) overlap the second portion of LLM coils (i.e. the LLM coils that are to be controlled by the second transport controller), all of the electrical variables of the LLM coils are uniquely controlled by the control device, although the first portion intersects the second portion of LLM coils.

If the two transport units approach one another, for example, such that the drive magnets of the two transport units overlap the same LLM coil at least in part, this would also mean that the electrical variable of this LLM coil should be controlled by two transport controllers simultaneously. A first and a second controlled variable should therefore be specified as an electrical variable respectively, which would lead to conflict. This is achieved according to the invention by an additional controlled variable being specified by the control unit. The additional controlled variable is derived from the first controlled variable and/or the second controlled variable using a predetermined function f.

Alternatively, the coil terminals of the LLM coil may be short-circuited.

Due to controlling LLM coils of this kind according to the invention, the planned movements of the transport units are influenced only negligibly.

The drive magnets "overlapping" the LLM coils means not only that the position of the LLM coils and the position of the drive magnets overlap, but also that there is a sufficient magnetic coupling between the LLM coil and the drive magnets of the relevant transport unit, which may also be the case on a drive magnet, e.g. due to leakage fields, at a small distance (corresponding to a fraction of the longitudinal expansion of the LLM coil) adjacent to the LLM coil.

A transport controller may also control the electrical variable of an LLM coil that does not overlap the transport controller or the drive magnets associated with the corresponding transport unit. This LLM coil, the electrical variable of which is controlled, may be located directly in front of and behind the transport unit as viewed in the direction of movement. This kind of control of electrical variables of LLM coils that are adjacent to the LLM coil that overlaps the drive magnets is also known as "soft mapping". Controlling the electrical variable of an LLM coil that completely overlaps the drive magnets of a transport unit is, however, referred to as "hard mapping" and as "medium mapping" in the case of partial overlapping. Controlling two LLM coils for each transport unit is often sufficient, in particular if the drive magnets of a transport unit expand over the length of three LLM coils. At least as many LLM coils should be controlled as are overlapped by the drive magnets of the relevant transport unit at least in part. Investigations into the force of attraction of the transport unit on the stator and the acting propelling force have shown that current ripple can be reduced when additional LLM coils are used. Other properties of the system, such as smoother propelling force or better efficiency, can be achieved by controlling additional coils. However, this requires "soft mapping" of these additional LLM coils. In particular, controlling six LLM coils in order to control a transport unit in the form of soft mapping may be advantageous in order to produce a symmetrical three-phase system. Six LLM coils are therefore controlled in order to form the traveling wave, i.e. for each transport unit, so many LLM coils are controlled, in the form of soft mapping, in front of or behind the LLM coils that overlap the drive magnets of this transport unit in the direction of movement that in total the electrical variables of six LLM coils are controlled for each transport unit.

The additional controlled variable may also correspond to the first controlled variable, which is particularly advantageous if the LLM coil overlaps the first drive magnets of the first transport unit in part or completely and does not overlap the second drive magnets of the second transport unit. This would mean that the first transport controller would intend to adjust the electrical variable to the first controlled variable using hard mapping (complete overlapping) or medium mapping (partial overlapping) and the second transport controller would intend to adjust the electrical variable to the second controlled variable using soft mapping, which would lead to conflict if not for the solution according to the invention. It is of course particularly advantageous in this case if the control unit takes on the first controlled variable from the first transport controller and specifies said controlled variable to the LLM coil as an electrical variable. The second controlled variable of the second transport controller therefore has no influence on the electrical variable. This therefore means that in this case, hard/medium mapping dominates over soft mapping.

Analogously, the additional controlled variables may correspond to the second controlled variable, which is particularly advantageous if the LLM coil overlaps the second drive magnets of the second transport unit in part or completely and does not overlap the second drive magnets of the second transport unit. This would mean that the second transport controller would intend to adjust the electrical variable of the LLM coil to the first controlled variable using hard mapping or medium mapping and the first transport controller would intend to adjust the electrical variable of the same LLM coil to the second controlled variable using soft mapping. As in the above-mentioned case, it is particularly advantageous here if the control unit takes on the second controlled variable from the second transport controller and specifies said controlled variable to the LLM coil as an electrical variable. In this case, the first controlled variable of the first transport controller therefore has no influence on the electrical variable, i.e. in this case, too, hard/medium mapping dominates over soft mapping.

Furthermore, the additional controlled variable may, however, be less than or equal to the first controlled variable and less than or equal to the second controlled variable in magnitude.

It is also advantageous if the additional controlled variable has a value between the first controlled variable and the second controlled variable, it being very particularly advantageous if the additional controlled variable corresponds to a mean value of the first controlled variable and the second controlled variable, it being possible to weight the mean value, e.g. depending on the relevant position of the transport unit.

The additional controlled variable may also correspond to the first or second controlled variable, for example depending on whether the first or second controlled variable is smaller or larger, or may assume a determined or calculated value below or above the first/second controlled variable, which may also depend, for example, on whether the first or second controlled variable is smaller/larger.

In summary, the conflict between a first controlled variable to be specified by a first transport controller and a second controlled variable to be specified by a second transport controller for the same LLM coil is controlled if the first and second drive magnets overlap the LLM coil in part, i.e. medium mapping is provided by the first and second transport controllers, in that an additional controlled variable is specified by the control unit of the LLM coil for the LLM coil as an electrical variable or the coil terminals of the LLM coil are short-circuited. Even if the first and second controlled variables should be specified for the same LLM coil as an electrical variable due to provided soft mapping, or if the first (or second) controlled variable to be specified is based on medium/hard mapping and the second (or first) controlled variable to be specified is based on soft mapping, an additional controlled variable can be specified as an electrical variable, or the coil terminals of the LLM coil can be short-circuited, in order to resolve the conflict. The additional controlled variable may, in turn, be derived from the first controlled variable and/or the second controlled variable using a predetermined function f and therefore be equal to the first controlled variable or the second controlled variable, for example, smaller than or equal to the first controlled variable and the second controlled variable in magnitude, or be derived from a mean value of the first and second controlled variables.

The control unit that specifies the additional controlled variable or short-circuits the coil terminals of the LLM coil may be an integral component of the first and/or second transport controller or be connected between the first and second transport controllers and the LLM coil.

Particularly advantageously, there is one control unit for each LLM coil.

A long-stator linear motor comprising a plurality n of LLM coils arranged adjacently in the direction of movement can therefore be provided with a device according to the invention for controlling the movement of two transport units.

The position of the drive magnets, and therefore of the transport units, can be determined e.g. by means of position sensors, which are typically already integrated in the long-stator linear motor. If drive magnets of a transport unit overlap an LLM coil, it can be assumed that the drive magnets and LLM coil interact magnetically, and the electrical variable is specified by the transport controller associated with the relevant transport unit. If an electrical variable is specified for an LLM coil only by one transport controller, this electrical variable can be controlled by the transport controller in a known manner.

The transport controllers could also control the electrical variables by means of a coil control unit associated with the relevant LLM coil. The coil control units would therefore be subordinate to the transport controllers. Of course, a plurality of coil control units could also be integrated in a common unit.

Other exemplary embodiments and advantages of the present invention may be ascertained by reviewing the present disclosure and the accompanying drawing.

BRIEF DESCRIPTION OF THE DRAWINGS

The present invention is described in the following with reference to FIGS. 1 to 3, which show exemplary, schematic and non-limiting advantageous embodiments of the invention. In the drawings.

DETAILED DESCRIPTION OF THE EMBODIMENTS

Figure 1:
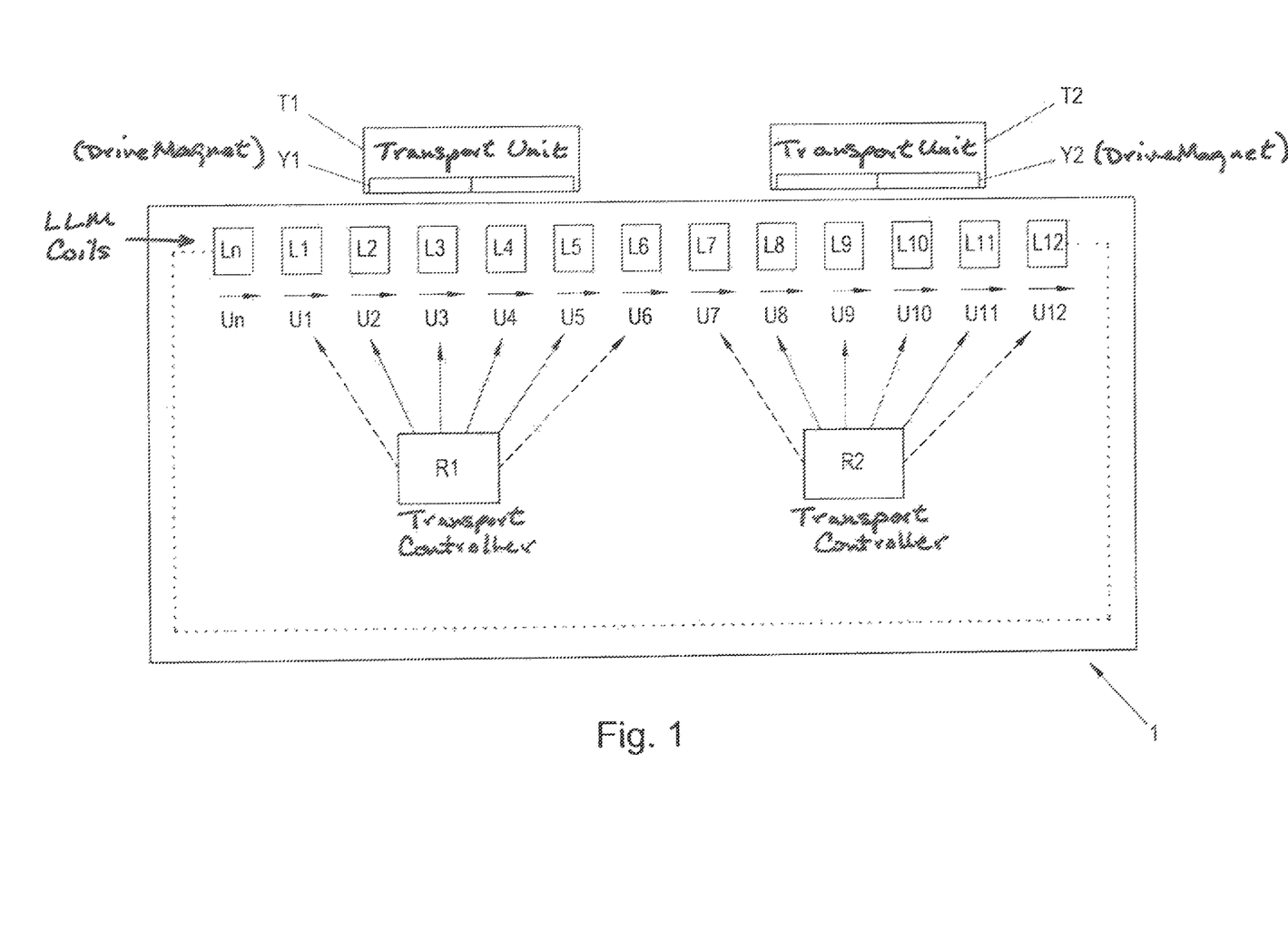
FIG. 1 shows a long-stator linear motor as a transport means comprising two mutually spaced transport units.

FIG. 1 shows a transport means in the form of a long-stator linear motor (LLM) by way of example. One transport portion 1 generally forms one part of a long stator of an LLM respectively and can be further divided in a known manner, for example into a number of individual transport segments that can also form a non-enclosed track. The transport means consists only of one transport portion 1 in FIG. 1 by way of example. A plurality n of electrical LLM coils L1, ..., Ln are arranged along the transport portion 1 in the longitudinal direction in a known manner, which coils interact with a number of drive magnets Y1, Y2 on a number of transport units T1, T2. A propelling force is independently generated in a known manner by means of transport controllers R1, R2 for each of the transport units T1, T2 by monitoring the electrical variables U1, ..., Un of the individual LLM coils L1, ..., Ln, which propelling force moves the transport units T1, T2 in the longitudinal direction along the transport route, or of the transport portion 1 individually (speed, acceleration, trajectory, direction) and independently (except to prevent possible collisions) by the other transport units T1, T2. In this case, preferably only the LLM coils L1, ..., Ln that interact with the drive magnets Y1, Y2 of the transport units T1, T2, or with the magnetic field thereof, are supplied directly or via an additional coil controller by specifying an electrical variable. After the magnetic field of the drive magnets Y1, Y2 rapidly drops in front of and behind the drive magnets Y1, Y2 in the direction of movement, only the LLM coils L1, ..., Ln that are overlapped by drive magnets Y1, Y2 (in FIG. 1, for example, the LLM coils L2, L3, L4 and L5 for the transport unit T1) should be supplied electrically. However, in addition, a number of LLM coils L1, ..., Ln in front of and behind the drive magnets Y1, Y2 in the direction of movement may be electrically supplied (in FIG. 1, for example, the LLM coils L1, L6 for the transport unit T1), which leads to smoother movement of the transport units T1, T2.

Figure 2A:
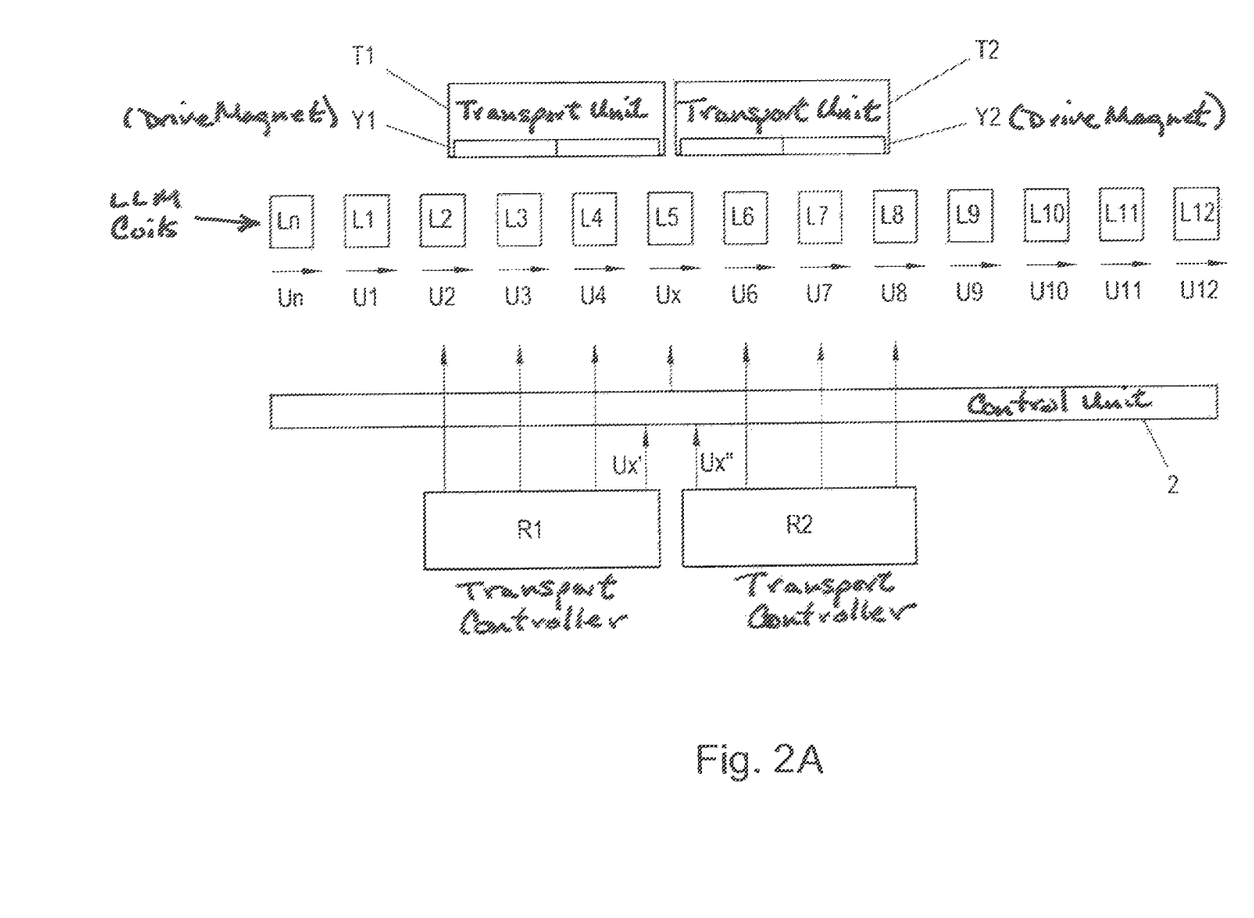
FIG. 2A shows the long-stator linear motor comprising directly adjacent transport units.
Figure 2B:
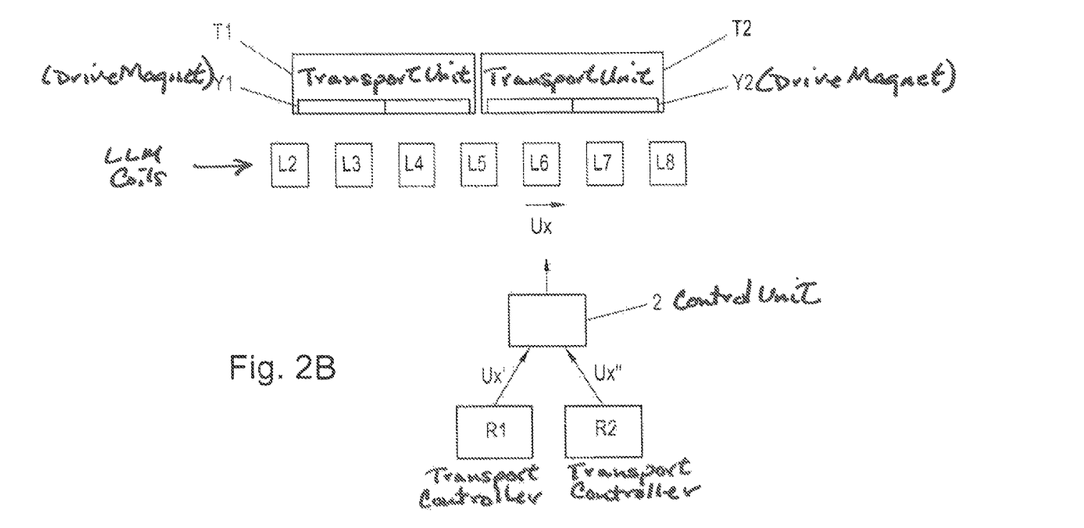
FIG. 2B shows the sixth LLM coil being controlled under the influence of two transport controllers.
Figure 2C:
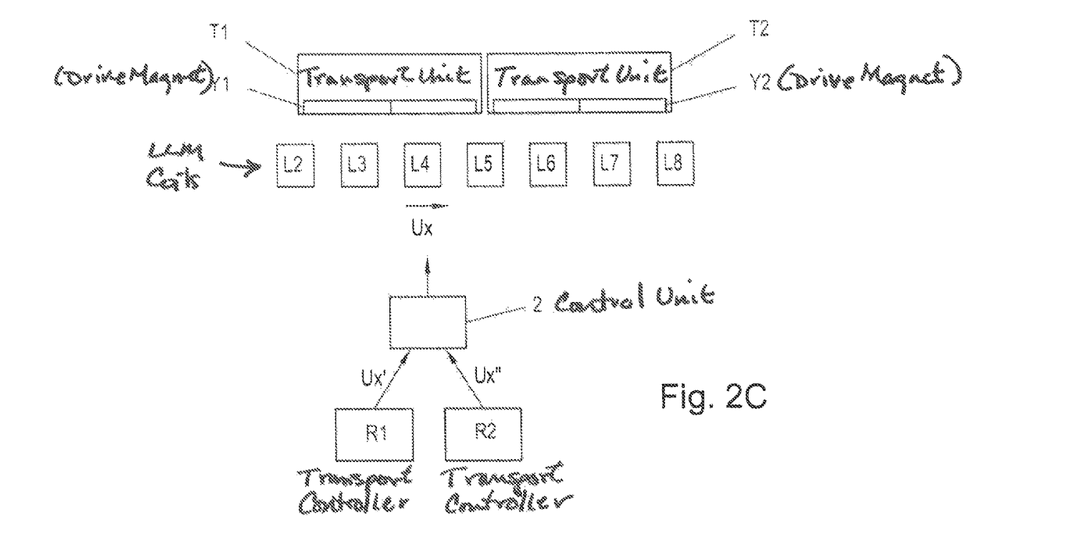
FIG. 2C shows the fourth LLM coil being controlled under the influence of two transport controllers.
Figure 3:
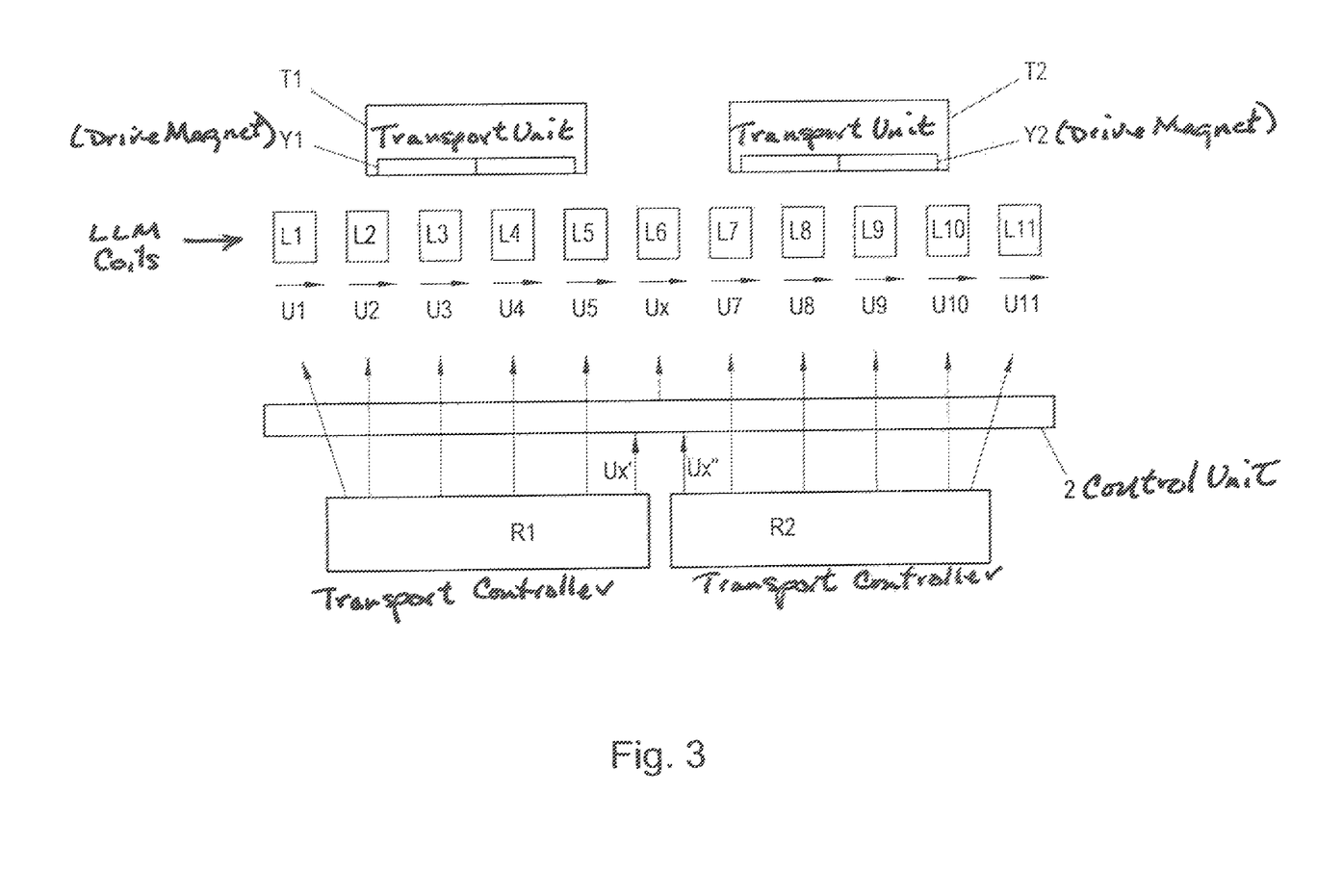
FIG. 3 shows the long-stator linear motor comprising two transport units located near one another.

As is known, it is conventional to use at least two drive magnets Y1, Y2 for each transport unit T1, T2. For reasons of clarity, FIG. 1-3 show only two transport units T1, T2, two associated drive magnets Y1, Y2 and two associated transport controllers R1, R2 by way of example. Usually, a plurality of LLM coils L1, ..., Ln overlap the drive magnets Y1, Y2 of the respective transport units T1, T2, which means that a transport controller R1, R2 assumes control of a plurality of electrical variables U1, ..., Un, in order to generate a propelling force by means of the magnetic fields of a plurality of LLM coils L1, ..., Ln generated by the flowing coil currents. In this case, it is in principle only necessary for the transport controllers R1, R2 to electrically supply the LLM coils L1, ..., Ln that overlap a transport unit T1, T2, or the drive magnets Y1, Y2 thereof, i.e. interact therewith. Of course, the propelling forces generated do not have to be equal for the individual transport units T1, T2 in this case. The coil currents impressed in the respective LLM coils L1, ..., Ln do not need to be equally high either, of course. However, the transport controllers R1, R2 may also control the electrical variables U1, ..., U2 of LLM coils L1, ..., Ln that do not interact with the drive magnets Y1, Y2 of the respective transport units Y1, Y2, which is referred to here as soft mapping.

Often, a position specification (also equivalently to a speed specification) is continuously specified (for example by a superordinate system control means or externally) for the transport controller R1, R2 for each transport unit T1, T2 to be moved, which position specifications are converted, at each time step of the control process, into electrical variables U1, ..., Un that are required for movement. Of course, in this case a transport controller R1, R2 could be constructed hierarchically, for example comprising a position controller, speed controller and/or force controller for each transport unit T1, T2 and a coil controller, i.e. a current controller and/or a voltage controller, for each LLM coil L1, ..., Ln, etc.

The electrical variables U1, ..., Un may directly represent a terminal voltage or a coil current of the LLM coils L1, ..., Ln; however, they may also be supplied to an amplifying circuit that applies, in turn, a terminal voltage to the coil terminals of the LLM coils L1, ..., Ln. An amplifying circuit may be directly provided on the transport controllers R1, R2, on additional coil controllers or on the LLM coils L1, ..., Ln. For the sake of clarity, no amplifying circuits or additional coil controllers were shown in FIG. 1-3.

The drive magnets Y1, Y2 may be designed as electromagnets (excitation coils) and/or as permanent magnets. Typically, for each transport unit T1, T2, there are a number of drive magnets Y1, Y2 arranged adjacently in the direction of movement, only one drive magnet Y1, Y2 for each transport unit T1, T2 being shown in FIG. 1-3 for the purpose of simpler illustration. The LLM coils L1, ..., Ln may be arranged on a ferromagnetic core (such as an iron laminated core), or may of course be coreless. Since the basic principle of a long-stator linear motor is sufficiently known, however, it will not be discussed here in further detail.

In FIG. 1-3, the first transport controller R1 and the second transport controller R2 control the electrical variables U1, ..., Un of the respective LLM coils L1, ..., Ln such that the first transport unit T1 or the second transport unit T2 assigned to the first transport controller R1 or the second transport controller R2, respectively, is moved along the stator. The transport controllers R1, R2 may therefore also control all the electrical variables U1, ..., Un, respectively, of all the LLM coils L1, ..., Ln that interact with a transport unit T1, T2, the electrical variables U1, ..., Un to be controlled depending on the position of the relevant transport unit T1, T2 in the direction of movement along the stator.

As mentioned, the electrical variables U1, ..., Un of the LLM coils L1, ..., Ln that overlap the drive magnets Y1, Y2 of a transport unit T1, T2, as viewed in the direction of movement, completely or in part are primarily controlled by the associated transport controller R1, R2, in order to control the movement of the transport unit T1, T2. Controlling the electrical variables U1, ..., Un when the drive magnets Y1, Y2 completely overlap the respective LLM coils L1, ..., Ln is referred to as hard mapping, or as medium mapping in the case of partial overlapping. In FIG. 1, the first transport controller R1 would therefore control the second electrical variable U2, the third electrical variable U3, the fourth electrical variable U4 and the fifth electrical variable U5 (indicated by solid arrows), as the second LLM coil L2, the third LLM coil L3, the fourth LLM coil L4 and the fifth LLM coil L5 overlap the first drive magnet Y1 of the first transport unit T1. The first transport controller R1 therefore calculates the electrical variables U2, U3, U4, U5 to be specified for the respective LLM coils L2, L3, L4, L5, which correspond to a first portion of the plurality n of coils L1, ..., Ln. The second transport controller R2 would also control the eighth electrical variable U8, the ninth electrical variable U9, the tenth electrical variable U10 and the eleventh electrical variable U11 in the same way (also indicated by solid arrows), as the eighth LLM coil L8, the ninth LLM coil L9, the tenth LLM coil L10 and the eleventh LLM coil L11 overlap the second drive magnet Y2 of the second transport unit Z2. The second transport controller R2 therefore calculates the electrical variables U8, U9, U10, U11 to be specified for the respective LLM coils L8, L9, L10, L11, which correspond to a second portion of the plurality n of coils L1, . . . , Ln. Unique control of the individual electrical variables U2, U3, U4, U5, U8, U9, U10, U11 of the LLM coils L2, L3, L4, L5, L8, L9, L10, L11 is therefore ensured, as neither of the transport controllers R1, R2 attempts to control the same electrical variables U2, U3, U4, U5, U8, U9, U10, U11, i.e. the first and second portions of the LLM coils L1, . . . , Ln do not intersect.

A transport controller R1, R2 may also, within the context of soft mapping, assume control of LLM coils that are in front of and behind the relevant transport unit T1, T2 when viewed in the direction of movement, i.e. in front of and behind the LLM coils that overlap the drive magnets Y1, Y2 of the relevant transport unit T1, T2 completely or in part, for example the LLM coils L1, L6, L7 and L12 in FIG. 1. In the case of soft mapping, the first electrical variable U1 of the first LLM coil L1 and the sixth electrical variable U6 of the sixth LLM coil L6 would therefore be controlled by the transport controller R1, and the seventh electrical variable U7 of the LLM coil L7 and the twelfth electrical variable U12 of the twelfth LLM coil L12 would be controlled by the second transport controller R2. The first portion is therefore extended to include the LLM coils L1 and L6; the second portion is extended to include the LLM coils L7 and L12. In this case, too, unique control of the individual electrical variables U1, U6, U7, U12 of the LLM coils L1, L6, L7, L12 is ensured in the position of the transport units T1, T2 according to FIG. 1, as neither of the transport controllers R1, R2 attempts to control the same electrical variables U1, U6, U7, U12. The first and second portions therefore do not overlap/intersect again. Soft mapping control is indicated by dashed arrows in FIG. 1-3.

FIG. 2A shows a section of the transport device from FIG. 1, two transport units T1, T2 being positioned adjacently. A control unit 2 is connected between the two transport controllers R1, R2 and the LLM coils L1, . . . , Ln, however. Of course, it would also be possible that a control unit 2 is available for a plurality of or each LLM coil L1, . . . , Ln or the control unit(s) 2 are an integral component of the transport controllers R1, R2. The first transport unit T1 is, as in FIG. 1, in a position in which the second LLM coil L2, the third LLM coil L3, the fourth LLM coil L4 and the fifth LLM coil L5 overlap the first drive magnet Y1 of the first transport unit Z1. However, the second transport unit T2 is directly adjacent to the first transport unit T1, whereby the second drive magnet Y2 overlaps the fifth LLM coil L5, the sixth LLM coil L6, the seventh LLM coil L7 and the eighth LLM coil L8. The electrical variables U2, U3, U4, U6, U7, U8 are not influenced by the control unit 2 and specified for the LLM coils L2, L3, L4, L6, L7, L8, as there is no conflict here between the transport controllers R1, R2. In FIG. 2, the additional electrical variables U1, U9, U10, U11, U12, . . . , Un are not actively controlled by the transport controllers R1, R2 and are therefore not actively controlled by the control unit 2. These non-actively controlled electrical variables U1, U9, U10, U11, U12, . . . , Un could also be set to zero by the control unit 2, of course.

The fifth LLM coil L5 is therefore overlapped by both the first drive magnet Y1 and the second drive magnet Y2, whereby the fifth LLM coil L5 is part of the first portion and the second portion. The method according to the invention should therefore be observed in FIG. 2A with focus on this fifth LLM coil L5: The first transport controller R1 intends to specify a first controlled variable Ux' for the relevant LLM coil Lx (L5 in this case) and the second transport controller R2 intends to specify a second controlled variable Ux", i.e. the first transport controller R1 and the second transport controller intend to use medium mapping control (indicated again by solid arrows). However, the control unit 2 detects this coil conflict and specifies an additional controlled variable Ux for the relevant LLM coil Lx (L5 in this case). This additional controlled variable Ux is advantageously derived from the first controlled variable Ux' and/or the second controlled variable Ux" using a predetermined function f (Ux=f(Ux', Ux"), or Ux=f(Ux') or Ux=f(Ux)). Particularly advantageously, a mean value of the first controlled variable Ux' and the second controlled variable Ux" or the first controlled variable Ux' or the second controlled variable Ux" may be used as the additional controlled variable Ux.

In order to control the movement of a transport unit T1, T2, the relevant actual position of the transport unit T1, T2 is always known; for example, the respective actual positions can be detected by means of suitable and known position sensors. As the construction and geometry of the transport units T1, T2 and the arrangement of the drive magnets Y1, Y2 are also known, it is always possible to detect, by means of the known positions, when there is a coil conflict of this kind.

Alternatively, the coil terminals of the relevant (in this case fifth) LLM coil could be short-circuited, which means that neither of the two transport controllers actively specify a controlled variable Ux', Ux" for the relevant (in this case fifth) LLM coil L5, whereby the conflict is settled in this case, too.

FIG. 2B shows the constellation according to FIG. 2A with focus on the sixth LLM coil L6, the electrical variables of the other LLM coils L1, . . . , L5, L7, . . . , Ln not being observed in this case. Soft mapping is also used in this case, whereby the first transport controller R1 intends to specify a first controlled variable Ux' for the sixth LLM coil L6, which is indicated by the arrow from the first transport controller R1 to the control unit 2. However, the sixth LLM coil L6 would also be controlled by the second transport controller R2 within the context of hard mapping, which transport controller specifies the second controlled variable Ux", which is indicated by the arrow from the second transport controller R1 to the control unit. This means that the sixth LLM coil L6 is part of the first portion and of the second portion. Advantageously, an additional controlled variable Ux is specified for the sixth LLM coil L6 by the control unit 2 in order to resolve this conflict. This additional controlled variable Ux is advantageously derived from the first controlled variable Ux' and/or the second controlled variable Ux" using a predetermined function f (Ux=f(Ux', Ux"), or Ux=f(Ux'), or Ux=f(Ux")). Very particularly advantageously, the second controlled variable Ux" or the first controlled variable Ux' may be used as the additional controlled variable Ux, medium/hard mapping being preferred over soft mapping in the case of simultaneously intended medium/hard and soft mapping control of the same LLM coil Lx (medium mapping of the LLM coil L6 in this case). In this case, this therefore means that the second controlled variable Ux", which is advantageously provided directly by the second transport controller R2, is specified by the control unit 2 for the sixth LLM coil L6 as the additional controlled variable Ux. The first controlled variable Ux' provided by the first transport controller R1 would therefore have no influence on the additional controlled variable Ux specified for the sixth LLM coil L6.

FIG. 2C shows the constellation according to FIG. 2A in an analogous manner to FIG. 2B, but with focus on the fourth LLM coil L4, which is part of the first portion and the second portion in this case. In this case, the first transport controller R1 intends to specify a first controlled variable Ux' to the fourth LLM coil L4 within the context of soft mapping (arrow from the first transport controller R1 to the control unit 2). However, the second transport controller R2 intends to specify a second controlled variable Ux" for the fourth LLM coil L4 within the context of hard mapping (arrow from the second transport controller R1 to the control unit 2). Advantageously, the control unit 2 specifies an additional controlled variable Ux for the fourth LLM coil L4 in this case, too. This additional controlled variable Ux is advantageously derived from the first controlled variable Ux' and/or the second controlled variable Ux" using a predetermined function f (Ux=f(Ux', Ux"), or Ux=f(Ux'), or Ux=f(Ux")). A mean value of the first controlled variable Ux' and the second controlled variable Ux" can also be used as an additional controlled variable Ux in the present case. The first controlled variable Ux' or the second controlled variable Ux" can also be used as an additional controlled variable Ux, medium/hard mapping being preferred in this case for simultaneously intended medium/hard mapping and soft mapping control of an LLM coil Lx (L4 in this case), i.e. medium mapping using the first controlled variable Ux', which is advantageously provided directly by the first transport controller R1 and is passed on to the fourth LLM coil by the control unit 2. In this case, the second transport controller would have no influence on the fourth electrical variable Ux of the fourth LLM coil L4.

In the constellation according to FIG. 2A, in the case of soft mapping control, the electrical variable U1 of the first LLM coil L1 would be controlled by the first transport controller R1, for example, or the electrical variable U9 of the ninth LLM coil L9 would be controlled by the second transport controller R2. However, in both cases, there is no conflict, as the other transport controller R1, R2 respectively does not intend to control the electrical variable U1, U9 of the respective LLM coils L1, L9 and there is no conflict that would have to be resolved by a control unit 2.

FIG. 3 shows a constellation in which two transport units T1, T2 approach one another, or have already approached one another, such that none of the LLM coils L1, ..., Ln is overlapped by the drive magnets Y1, Y2 of the two transport units T1, T2. The first transport unit T1 is again in a position in which the second LLM coil L2, the third LLM coil L3, the fourth LLM coil L3 and the fifth LLM coil L5 overlap the first drive magnet Y1 of the first transport unit T1. The first transport controller R1 therefore controls the second electrical variable U2, the third electrical variable U3, the fourth electrical variable U4 and the fifth electrical variable U5. However, the second transport unit T2 is closer to the first transport unit T1 than is shown in FIG. 1, whereby the second drive magnet Y2 overlaps the seventh LLM coil L7, the eighth LLM coil L8, the ninth LLM coil L9 and the tenth LLM coil L10. The sixth LLM coil L6 therefore overlaps neither the first drive magnet Y1 nor the second drive magnet Y2. However, if the two transport controllers R1, R2 assume control of the sixth LLM coil L6 within the context of soft mapping, the first transport controller R1 intends to specify a first controlled variable Ux' for the sixth LLM coil L6 and the second transport controller R2 intends to specify a second controlled variable Ux" for the sixth LLM coil L6, whereby the sixth LLM coil L6 is part of the first portion and second portion. This is the case here by way of example, as the sixth LLM coil L6 is adjacent to the coils U5 and U7 that overlap the drive magnets Y1, Y2. According to the invention, in this case, an additional controlled variable Ux is specified by the control unit 2 for the sixth LLM coil L6. This additional controlled variable Ux can also be derived from the first controlled variable Ux' and/or the second controlled variable Ux" using a predetermined function f (Ux=f(Ux', Ux"), or Ux=f(Ux'), or Ux=f(Ux")). Advantageously, if the two transport controllers R1, R2 intend to specify a first or second controlled variable Ux', Ux" for the same LLM coil (L6 in this case) within the context of soft mapping, the additional specified controlled variable Ux corresponds to the mean value of the first controlled variable Ux' and the second controlled variable Ux", but may also correspond to one of the two controlled variables Ux', Ux", or the coil terminals of the relevant LLM coil L6 may be short-circuited, whereby no electrical variables are actively specified for the relevant LLM coil (L6 in this case).

An additional controlled variable Ux can therefore be specified by the control unit for all conflict situations between the first and second controlled variables Ux', Ux", which are to be specified for an LLM coil Lx by the first and second transport controllers R1, R2, respectively, as an electrical variable, i.e. soft mapping+soft mapping, soft mapping+medium/hard mapping, medium mapping+medium mapping. Preferably, the additional controlled variable corresponds to a mean value of the first controlled variable Ux' and the second controlled variable Ux". However, said additional controlled variable may also be equal to the first controlled variable Ux' or equal to the second controlled variable Ux".

In the constellation according to FIG. 3, in the case of soft mapping control, the controlled variable U1 of the first LLM coil L1 would be controlled by the first transport controller R1, for example, and the controlled variable U11 of the eleventh LLM coil L11 would be controlled by the second transport controller R2. However, in both cases, there is no conflict, as the other transport controller R1, R2 respectively does not intend to control the electrical variable U1, U11 of the respective LLM coils L1, L11, whereby the respective electrical variables U1, U11 are fed to the respective LLM coils L1, L11 by the control unit 2.

Finally, it should be noted again that not only one control unit 2, as indicated in FIG. 2A or FIG. 3, has to be placed between all the LLM coils L1, ..., Ln and the transport controller R1, R2. Individual control units 2 could also be available for individual LLM coils L1, ..., Ln (as indicated in FIG. 2B or 2C), or the control unit(s) can/could be an integral component of the transport controllers R1, R2 and additional coil controllers, amplifying circuits etc. could be available.

The invention claimed is:

1. A method for controlling the movement of two transport units of a long-stator linear motor (LLM), which includes a plurality of LLM coils arranged adjacently in a direction of movement, a first transport unit comprising a first amount of first drive magnets arranged adjacently in the direction of movement, and a second transport unit comprising a second amount of second drive magnets arranged adjacently in the direction of movement, the method comprising:

controlling movement of the first transport unit by calculating electrical variables to be specified respectively for a first portion of the plurality of LLM coils, controlling movement of the second transport unit by calculating electrical variables to be specified respectively for a second portion of the plurality of LLM coils, determining whether a first controlled variable is specified for an LLM coil for the first portion as an electrical variable and a second controlled variable is simultaneously specified for a same LLM coil for the second portion as an electrical variable, wherein, when the same LLM coil is simultaneously specified with a first control variable and a second control variable, one of:

specifying an additional controlled variable that is derived from at least one of the first controlled variable or the second controlled variable using a predetermined function f (Ux=f(Ux', Ux"), or Ux=f (Ux') or Ux=f(Ux")), for the same LLM coil as an electrical variable, where Ux' is the electrical variable of the first control variable and Ux" is the electrical variable of the second control variable, or short-circuiting the coil terminals of the same LLM coil.

2. The method according to claim 1, wherein the additional controlled variable has a value between the first controlled variable and the second controlled variable.

3. The method according to claim 2, wherein the additional controlled variable corresponds to a mean value of the first controlled variable and of the second controlled variable.

4. The method according to claim 1, wherein the additional controlled variable corresponds to the first controlled variable or to the second controlled variable.

5. A long-stator linear motor system with controlled movement of two transport units of a long-stator linear motor (LLM), the system comprising:

a plurality of LLM coils arranged adjacently in a direction of movement;

a first transport unit comprising a first number of first drive magnets arranged adjacently in the direction of movement, and a second transport unit comprising a second number of drive magnets arranged adjacently in the direction of movement, wherein movement of the first transport unit is controlled by calculating electrical variables to be specified respectively for a first portion of the plurality of LLM coils, wherein movement of the second transport unit is controlled by calculating electrical variables to be specified respectively for a second portion of the plurality of LLM coils, wherein, when a first controlled variable is specified for one of the LLM coils as an electrical variable while a second controlled variable is simultaneously specified for the one of the LLM coils as an electrical variable, one of:

an additional controlled variable that is derived from at least one of the first controlled variable or the second controlled variable using a predetermined function f (Ux=f(Ux', Ux"), or Ux=f(Ux'), or Ux=f(Ux")) is specified for the one of the LLM coils as an electrical variable, where Ux' is the electrical variable of the first control variable and Ux" is the electrical variable of the second control variable, or the coil terminals of the one of the LLM coils is short-circuited.

6. The long-stator linear motor system according to claim 5, wherein a first transport controller is associated with the first portion, a second transport controller is associated with a second portion and a control unit is connected to the first transport controller, to the second transport controller and to the one of the LLM coils, and wherein the control unit is an integral component of at least one of the first or second transport controller.

7. The long-stator linear motor system according to claim 5, wherein a first transport controller is associated with the first portion, a second transport controller is associated with a second portion and a control unit is connected to the first transport controller, to the second transport controller and to the one of the LLM coils, wherein the control unit is connected between the first and second transport controllers and the one of the LLM coils.

8. The long-stator linear motor system according to claim 5, wherein a first transport controller is associated with the first portion, a second transport controller is associated with a second portion and a control unit is connected to the first transport controller, to the second transport controller and to the one of the LLM coils, and wherein there is one control unit for each LLM coil.

* * * * *